US009058302B2

(12) United States Patent
Magerlein

(10) Patent No.: US 9,058,302 B2
(45) Date of Patent: *Jun. 16, 2015

(54) COMBINED MATRIX-VECTOR AND MATRIX TRANSPOSE VECTOR MULTIPLY FOR A BLOCK-SPARSE MATRIX

(75) Inventor: Karen A. Magerlein, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/430,028

(22) Filed: Mar. 26, 2012

(65) Prior Publication Data

US 2012/0179440 A1 Jul. 12, 2012

Related U.S. Application Data

(63) Continuation of application No. 12/057,693, filed on Mar. 28, 2008, now Pat. No. 8,175,853.

(51) Int. Cl.
*G06F 17/10* (2006.01)
*G06F 3/048* (2013.01)
*G06F 17/16* (2006.01)
*A63F 13/30* (2014.01)

(52) U.S. Cl.
CPC .......... *G06F 17/16* (2013.01); *A63F 2300/5553* (2013.01); *A63F 13/12* (2013.01)

(58) Field of Classification Search
USPC ........................................................ 703/2, 6
See application file for complete search history.

(56) References Cited

U.S. PATENT DOCUMENTS

| 4,996,661 | A | * | 2/1991 | Cox et al. .................... 708/508 |
| 5,369,594 | A | | 11/1994 | Huang et al. |
| 5,557,710 | A | * | 9/1996 | Amdursky et al. ........... 345/419 |
| 5,600,843 | A | * | 2/1997 | Kato et al. ...................... 712/19 |
| 5,604,911 | A | * | 2/1997 | Ushiro ............................. 703/2 |
| 5,654,820 | A | | 8/1997 | Lu et al. |

(Continued)

OTHER PUBLICATIONS

B. D'Amora, K. Magerlien, A. Binstock, A. Nanda, and B. Yee, "High-performance server systems and the next generation of online games", IBM system Journal, vol. 45, No. 1, pp. 103-118, 2006.*

(Continued)

*Primary Examiner* — Kibrom K Gebresilassie
(74) *Attorney, Agent, or Firm* — Cantor Colburn LLP; Michael LeStrange

(57) ABSTRACT

Systems and methods for combined matrix-vector and matrix-transpose vector multiply for block sparse matrices. Exemplary embodiments include a method of updating a simulation of physical objects in an interactive computer, including generating a set of representations of objects in the interactive computer environment, partitioning the set of representations into a plurality of subsets such that objects in any given set interact only with other objects in that set, generating a vector b describing an expected position of each object at the end of a time interval h, applying a biconjugate gradient algorithm to solve $A*\Delta v=b$ for the vector $\Delta v$ of position and velocity changes to be applied to each object wherein the $q=Ap$ and $qt=A^T(pt)$ calculations are combined so that A only has to be read once, integrating the updated motion vectors to determine a next state of the simulated objects, and converting the simulated objects to a visual.

12 Claims, 5 Drawing Sheets

(56) References Cited

U.S. PATENT DOCUMENTS

| | | | |
|---|---|---|---|
| 5,684,723 | A | 11/1997 | Nakadai |
| 6,230,101 | B1 | 5/2001 | Wallis |
| 6,901,422 | B1* | 5/2005 | Sazegari .................. 708/607 |
| 7,084,884 | B1* | 8/2006 | Nelson et al. ................. 345/619 |
| 7,236,998 | B2 | 6/2007 | Nutter et al. |
| 7,589,720 | B2 | 9/2009 | Zhou et al. |
| 7,720,651 | B2* | 5/2010 | Canning ......................... 703/2 |
| 7,734,448 | B2* | 6/2010 | Canning ......................... 703/2 |
| 7,840,626 | B1 | 11/2010 | Keenan |
| 7,945,430 | B2* | 5/2011 | Canning ......................... 703/2 |
| 8,175,853 | B2* | 5/2012 | Magerlein ......................... 703/2 |
| 8,255,849 | B1* | 8/2012 | Okhmatovski et al. ....... 716/110 |
| 8,312,402 | B1* | 11/2012 | Okhmatovski et al. ....... 716/113 |
| 8,473,539 | B1* | 6/2013 | Rao et al. ..................... 708/522 |
| 2003/0012083 | A1 | 1/2003 | Brunet |
| 2003/0068097 | A1 | 4/2003 | Wilson et al. |
| 2004/0199365 | A1* | 10/2004 | Washizawa ...................... 703/1 |
| 2004/0230632 | A1* | 11/2004 | Buchert et al. ................. 708/622 |
| 2005/0071578 | A1 | 3/2005 | Day et al. |
| 2005/0193050 | A1* | 9/2005 | Sazegari ...................... 708/607 |
| 2006/0028466 | A1 | 2/2006 | Zhou et al. |
| 2006/0235667 | A1* | 10/2006 | Fung et al. ...................... 703/10 |
| 2007/0085851 | A1 | 4/2007 | Muller et al. |
| 2008/0025633 | A1 | 1/2008 | Szeliski |
| 2008/0069445 | A1 | 3/2008 | Weber |
| 2008/0097730 | A1* | 4/2008 | Canning ......................... 703/1 |
| 2008/0140751 | A1 | 6/2008 | Ide et al. |
| 2009/0154796 | A1 | 6/2009 | Gupta et al. |
| 2009/0228244 | A1* | 9/2009 | Naudet et al. ..................... 703/2 |
| 2009/0248778 | A1* | 10/2009 | Magerlein ..................... 708/520 |
| 2009/0326880 | A1* | 12/2009 | Rodyushkin et al. ............ 703/2 |
| 2011/0010409 | A1* | 1/2011 | DeLaquil et al. ............. 708/446 |
| 2011/0040821 | A1* | 2/2011 | Eichenberger et al. ....... 708/607 |
| 2013/0114716 | A1* | 5/2013 | Gao et al. ................. 375/240.14 |

OTHER PUBLICATIONS

M. H. Gutknecht, "Block Krylov Space Methods for Linear Systems with Multiple Right-Hand Sides: An Introduction", 2006, pp. 1-22.*

B. D'Amora, K. Magerlein, A. Binstock, A. Nanda, B. Yee, "High performance server systems and next generation of online games", IBM system journal, vol. 45, No. 1, 2006, pp. 103-118.*

B. D'Amora, K. Magerlein, A. Binstock, A. Nanda, B. Yee, "High performance server systems and next generation of online games", IBM system journal, vol. 45, No. 1, published online Jan. 12, 2006, pp. 103-118.*

"BiConjugate Gradient (BiCG)," [online]; [retrieved on Dec. 11, 2006]; retrieved from the Internet http://www.netlib.org/linalg/html_tmeplates/node32.html.

Conjugate graident method, Wikipedia, pp. 1-9, printed Mar. 15, 2011.

B. D'Amora et al, "High performance server systems and next generation of online games", IBM system journal, vol. 45, No. 1, published online Jan. 12, 2006, pp. 103-118.

B. D'Amora et al., "Online Game Technology", IBM Systems Journal; Jan. 12, 2006.

* cited by examiner

COMBINED MATRIX-VECTOR AND MATRIX TRANSPOSE VECTOR MULTIPLY FOR A BLOCK-SPARSE MATRIX

CROSS-REFERENCE TO RELATED APPLICATIONS

This application is a continuation of U.S. patent application Ser. No. 12/057,693, filed Mar. 28, 2008, the disclosure of which is incorporated by reference herein in its entirety.

BACKGROUND

This invention relates to matrix-vector calculations on general-purpose computers, and particularly to systems and methods for a combined matrix-vector and matrix-transpose vector multiply for a block sparse matrix on a single instruction, multiple data (SIMD) processor.

A physics engine for an online game provides simulation of a simplified model of real-world physics. Typically, integration is required to determine, given position and momentum information about the objects in the world, where each object will be after the next time step. This determination can be done using semi-implicit integration of a penalty force-based system (a dynamic system that enforces constraints by applying a restorative force when a constraint is violated). The properties of the system are represented as a block-sparse matrix A and a vector b. The biconjugate gradient algorithm is used to solve $A*\Delta v=b$, and then the vector $\Delta v$ is used to update the system for the next time step. For the online game application, speed of computation is more important than great accuracy; it is sufficient to perform these calculations in single precision floating point without taking special measures to ensure numerical accuracy.

The physics engine for an online game may operate as follows. In a typical online game physics engine, each object in the virtual world is represented as one or more rigid bodies; multiple bodies may be necessary to represent such things as robots with moving parts. The system stores information about the position and motion of each rigid body at a given time $t_0$, along with an indication of whether each body is potentially moving (active) or at rest (sleeping). This indication reduces the amount of calculation required because unless something happens to a sleeping body, it remains where it is and there is no need to calculate a new position for it. In order to derive the positions and motions of the active bodies at some future time $t_0+\Delta t$, the following steps are performed: 1) determine which of the rigid bodies are colliding; 2) wake any sleeping bodies with which an active body has collided; 3) partition the active bodies into non-interacting groups; 4) put to sleep the active bodies in any group which has come to rest; and 5) integrate each of the groups of active bodies to determine their position/motion for the next step.

For game systems developed to run on the Cell Broadband Engine Architecture (Cell BE), the first four steps run on the power-processing element (PPE), the main processor, which acts as a controller for the several synergistic processing elements (SPEs). The integration step (which is numerically intensive) is farmed out to the SPEs. Ideally, each partition of the set of active bodies is handled by a single SPE. In practice, the size of the group that fits on an SPE is constrained by the amount of local store available on the SPE. Therefore, an additional step of decoupling, which breaks up the groups into smaller groups, is used to obtain groups that fit on an SPE. This step introduces some errors into the simulation, but they can be managed. However, the necessity of decoupling places a premium on a space-efficient implementation of the integration algorithm; the less storage is required to integrate a group of a given size, the larger the group that can be integrated without decoupling.

To integrate a group on the SPE, the PPE supplies information on the positions and motions of the rigid bodies in the group, the forces which connect them (these can be used to define hinges and joints), and the points where one rigid body is in contact with another. The SPE then performs the following steps: 1) form the matrix A and the vector b which describe the system; 2) solve $A*\Delta v=b$ using the biconjugate gradient method; and 3) return $\Delta v$ to the PPE, which uses it to update the positions and motions of the rigid bodies.

In the maximal coordinates representation, each rigid body contributes six coordinates to b, and A is a square matrix containing six elements per dimension for each rigid body. A is typically block-sparse; that is, it can be divided into a grid of 6×6-element submatrices, most of which are all zero but a few of which have nonzero elements. In particular, the diagonal blocks are nonzero, and there is a pair of off-diagonal nonzero blocks for each pair of bodies that interact directly. It is well known that by storing only the nonzero blocks, along with information giving the position of each block within the matrix, the storage required for the array A can be greatly reduced, and the computation required to perform calculations which can only yield zero results can be avoided.

The biconjugate gradient algorithm used to solve $A*\Delta v=b$ is well-known, and can be expressed as follows:

```
Pseudocode:
Compute r⁽⁰⁾ = b − Ax⁽⁰⁾ for some initial guess x⁽⁰⁾.
Choose r̃⁽⁰⁾ (for example, r̃⁽⁰⁾ = r⁽⁰⁾).
    for i = 1, 2, ...
        solve Mz⁽ⁱ⁻¹⁾ = r⁽ⁱ⁻¹⁾
        solve Mᵀz̃⁽ⁱ⁻¹⁾ = r̃⁽ⁱ⁻¹⁾
        ρᵢ₋₁ = z⁽ⁱ⁻¹⁾ᵀr̃⁽ⁱ⁻¹⁾
        if ρᵢ₋₁ = 0, method fails
        if i = 1
            p⁽ⁱ⁾ = z⁽ⁱ⁻¹⁾
            p̃⁽ⁱ⁾ = z̃⁽ⁱ⁻¹⁾
        else
            βᵢ₋₁ = ρᵢ₋₁/ρᵢ₋₂
            p⁽ⁱ⁾ = z⁽ⁱ⁻¹⁾ + βᵢ₋₁p⁽ⁱ⁻¹⁾
            p̃⁽ⁱ⁾ = z̃⁽ⁱ⁻¹⁾ + βᵢ₋₁p̃⁽ⁱ⁻¹⁾
        endif
        q⁽ⁱ⁾ = Ap⁽ⁱ⁾
        q̃⁽ⁱ⁾ = Aᵀp̃⁽ⁱ⁾
        αᵢ = ρᵢ₋₁/p̃⁽ⁱ⁾ᵀq⁽ⁱ⁾
        x⁽ⁱ⁾ = x⁽ⁱ⁻¹⁾ + αᵢp⁽ⁱ⁾
        r⁽ⁱ⁾ = r⁽ⁱ⁻¹⁾ − αᵢq⁽ⁱ⁾
        r̃⁽ⁱ⁾ = r̃⁽ⁱ⁻¹⁾ − αᵢq̃⁽ⁱ⁾
        check convergence; continue if necessary
    end
```

The pseudocode above is from a "Mathworld" (mathworld.com) article by Noel Black and Shirley Moore, adapted from Barret et al (1994). The computation at the top of the loop is sometimes simplified (at a cost of possibly having to do more iterations) by replacing the preconditioner M with the identity matrix. In this case the first two lines in the loop become $z^{(i-1)}=r^{(i-1)}$ and $\tilde{z}^{(i-1)}=\tilde{r}^{(i-1)}$. Inspection of the subsequent calculations shows that it is not necessary to form z and z̃ at all; r and r̃ can be substituted. The most computationally intensive part of this procedure that remains is the formation of the two matrix-vector products $q^{(i)}=Ap^{(i)}$ and $\tilde{q}^{(i)}=A^T\tilde{p}^{(i)}$. The straightforward way to do this computation is to have a procedure which multiplies a matrix and a vector together, to use it to obtain the first product, to form the transpose of A, and to use the routine again to form the second product. The disadvantages of this are the computation and storage required to form the transpose of A and the fact that the elements of A must be read out of storage twice per iteration for the multiplications, once from the original matrix and once from the transpose. In addition, for a processor such as the Cell BE SPE, the number of instructions used to load and store the data required for a matrix-vector multiply is much larger than the number of arithmetic instructions needed to perform the calculations, so that the full capability of the processor cannot be utilized.

There persists a need for modifications to the above-discussed pseudo-code for a combined matrix-vector and matrix-transpose vector multiply for a block sparse matrix on a single instruction, multiple data (SIMD) processor having the characteristics of the Cell BE SPE, namely, the ability to execute many instructions at once but with latencies of several cycles before results are available, and the desirability of having the number of arithmetic and logical computations at least as large as the number of loads and stores.

BRIEF SUMMARY

Embodiments of the invention include a method of updating a simulation of physical objects in an interactive computer environment having a processor, a memory and a display, the method including generating a set of representations of objects in the interactive computer environment; partitioning the set of representations into a plurality of subsets such that objects in any given set interact only with other objects in that set; generating a system of linear equations $A*\Delta v=b$ which describe the changes in velocities $\Delta v$ in terms of known characteristics of the objects such as mass and forces acting on the objects, said characteristics being used to generate the block-sparse matrix A and the vector b; applying a biconjugate gradient algorithm to solve $A*\Delta v=b$ for the vector $\Delta v$ of velocity changes to be applied to each object, wherein a single matrix-vector multiplication routine is called once per iteration to perform two matrix-vector multiplications, one involving A and the other involving the transpose of A, to determine the values of two vectors used to update the residuals used in the biconjugate gradient algorithm; applying the velocity changes to determine a next state of the simulated objects; and converting the simulated objects to a visual representation comprising pixel data for display.

Additional embodiments include a method for a combined matrix-vector and matrix transpose-vector multiplication calculation for a block-sparse matrix A which computes $q=Ap$ and $qt=A^T pt$ for iteratively solving a system of equations $A\Delta v=b$ for updating a simulation of physical objects in an interactive computer environment, the computer environment having a processor, a memory in which the matrix A and vectors p, pt, q, and qt are stored, and a plurality of registers capable of representing and operating on multiple matrix or vector elements in a single operation, the method including storing the matrix A as a collection of nonzero subblocks chained in a first dimension, with one chain for each position in a second dimension, such that each block includes an index giving its position in said first dimension and the subblock elements are stored in groups corresponding to the register size and ordered reading along said first dimension within the group; initializing each element of the vector q to zero; for each subblock chain along said second dimension, performing the steps of a) for each position along said first dimension of the subblock, initializing a register to all zeros as an accumulator; b) for each position along said second dimension of the subblock, filling a register with copies of the element of the p vector corresponding to that position; c) for each subblock in said chain, performing the steps of reading all groups of elements of said subblock into registers; reading the elements of q corresponding to the subblock elements along said second dimension into one or more registers, adding to said registers the sum of the products of the appropriate registers of matrix elements and copies of the p vector elements corresponding to said horizontal positions in the subblocks, and using the resulting register values to update said elements of q corresponding to said subblock elements along said second dimension; forming the products of the matrix elements with the elements of pt corresponding to the positions along said first axis and adding them to the corresponding accumulators; d) for each accumulator, summing the individual elements of the accumulator and storing the result as the element of qt corresponding to the chain offset by the accumulator's position within the subblock.

Further embodiments include a computer readable medium having computer executable instructions for performing a method of updating a simulation of physical objects in an interactive computer environment having a processor, a memory and a display, the method including generating a set of representations of objects in the interactive computer environment, partitioning the set of representations into a plurality of subsets such that objects in any given set interact only with other objects in that set, generating a block-sparse matrix A and a vector b for each subset, the block-sparse matrix representing the interactions between the objects in the subset, wherein nonzero sub-matrices representing the direct interaction of the objects are stored along with coordinate information corresponding to a position of each one of the plurality of sub-matrices within the first matrix, the sub-matrices being derived from the characteristics of the objects, applying a biconjugate gradient algorithm to solve $A*\Delta v=b$ for the vector $\Delta v$ of velocity changes to be applied to each object, wherein a single matrix-vector multiplication routine is called once per iteration to determine the values of two vectors used to update the residuals used in the biconjugate gradient algorithm, applying the vector of velocity changes $\Delta v$ to determine a next state of the simulated objects, and converting the simulated objects to a visual representation comprising pixel data for presentation on the display.

Further embodiments include a computer readable medium having computer executable instructions for performing a method of updating a simulation of physical objects in an interactive computer environment having a processor, a memory and a display, the method including generating a set of representations of objects in the interactive computer environment, partitioning the set of representations into a plurality of subsets such that objects in any given set interact only with other objects in that set, applying a biconjugate gradient algorithm to solve $A*\Delta v=b$ for the vector $\Delta v$ of velocity changes to be applied to each object, wherein solving $A*\Delta v=b$ comprises the following steps:

a. determining b-Ax, wherein A is a block-sparse matrix representing interactions between the objects and b is a vector representing an expected position of the objects;

b. assigning results of the b-Ax calculation to vectors r, rt, p, and pt;

c. defining a vector procedure computing the dot product of r and rt;

d. using the vector procedure to determine if the dot product result is 0, in which case, recording a calculation failure;

e. calculating the vectors $q=Ap$ and $qt=A^T(pt)$ using a single procedure which reads each subblock of A only once;

f. calculating scalar quantities $\alpha$ and $\beta$;

g. updating the x, r and rt vectors as defined by $x=x+\alpha p$, $r=r-\alpha q$, and $rt=rt-\alpha qt$;

h. computing the dot product of r and rt;

i. defining a test procedure for determining convergence of the dot product of r and rt;

j. using the test procedure to determine if convergence has occurred, in which case, recording a complete calculation;

k. using the vector procedure to determine if the dot product result is 0, in which case, recording a calculation failure;

l. updating the scalar β and the vectors p and pt;

m. iteratively repeating steps e-l until convergence of r and rt is achieved;

applying the vector of velocity changes Δv to determine a next state of the simulated objects; and converting the simulated objects to a visual representation comprising pixel data for presentation on the display.

Further embodiments include a method for a combined matrix-vector and matrix transpose-vector calculation for a block-sparse matrix A which computes q=Ap and qt=$A^T$(pt), for iteratively solving a system of equations A*Δv=b for updating a simulation of physical objects in an interactive computer environment, said computer environment having a processor, a memory in which said matrix A and vectors p, pt, q, and qt are stored, and a plurality of registers capable of representing and operating on multiple matrix or vector elements in a single operation, the method including storing the matrix A as a collection of nonzero subblocks chained in a first dimension, with one chain for each position in a second dimension, such that each block includes an index giving its position in said first dimension and the subblock elements are stored in groups corresponding to the register size and ordered reading along said first dimension within the group, initializing each element of the vector q to zero, for each subblock chain along said second dimension, performing, for each position along said first dimension of the subblock, initializing a register to all zeroes as an accumulator, for each position along said second dimension of the subblock, filling a register with copies of the element of the p vector corresponding to that position, for each subblock in said chain, performing, reading all groups of elements of said subblock into registers, reading the elements of q corresponding to the subblock elements along said second dimension into one or more registers, adding to said registers the sum of the products of the appropriate registers of matrix elements and copies of the p vector elements corresponding to said horizontal positions in the subblocks, and using the resulting register values to update said elements of q corresponding to said subblock elements along said second dimension, forming the products of the matrix elements with the elements of pt corresponding to the positions along said first axis and adding them to the corresponding accumulators, for each accumulator, summing the individual elements of the accumulator and storing the result as the element of qt corresponding to the chain offset by the accumulator's position within the subblock.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

TECHNICAL EFFECTS

As a result of the summarized invention, technically a novel implementation of the matrix-vector calculations q=A*p and qt=$A^T$*pt for a block-sparse matrix A and vectors p, pt, q, and qt which does not require explicit formation of $A^T$ has been achieved. The methods described herein can be implemented on a SIMD processor architecture such as that of the Cell BE SPEs. This method avoids forming the transposes of the individual blocks as well as of the full matrix; the transpose of the blocks is implicit in the way the multiplications are performed and accumulated. As such, rearrangement of the elements of each block to create a transposed block can be bypassed. This method reduces the amount of storage required and is more efficient on a SIMD architecture than forming the transpose of A and doing two separate matrix-vector multiplications.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments include systems and methods for a combined matrix-vector and matrix-transpose vector multiply for a block sparse matrix on a single instruction, multiple data (SIMD) processor.

In another exemplary embodiment, a similar calculation can be performed with chaining across block rows, the groups in row-major order, and the index indicating the subblock column, in which case p/q and pt/qt would change places.

Figure 1:
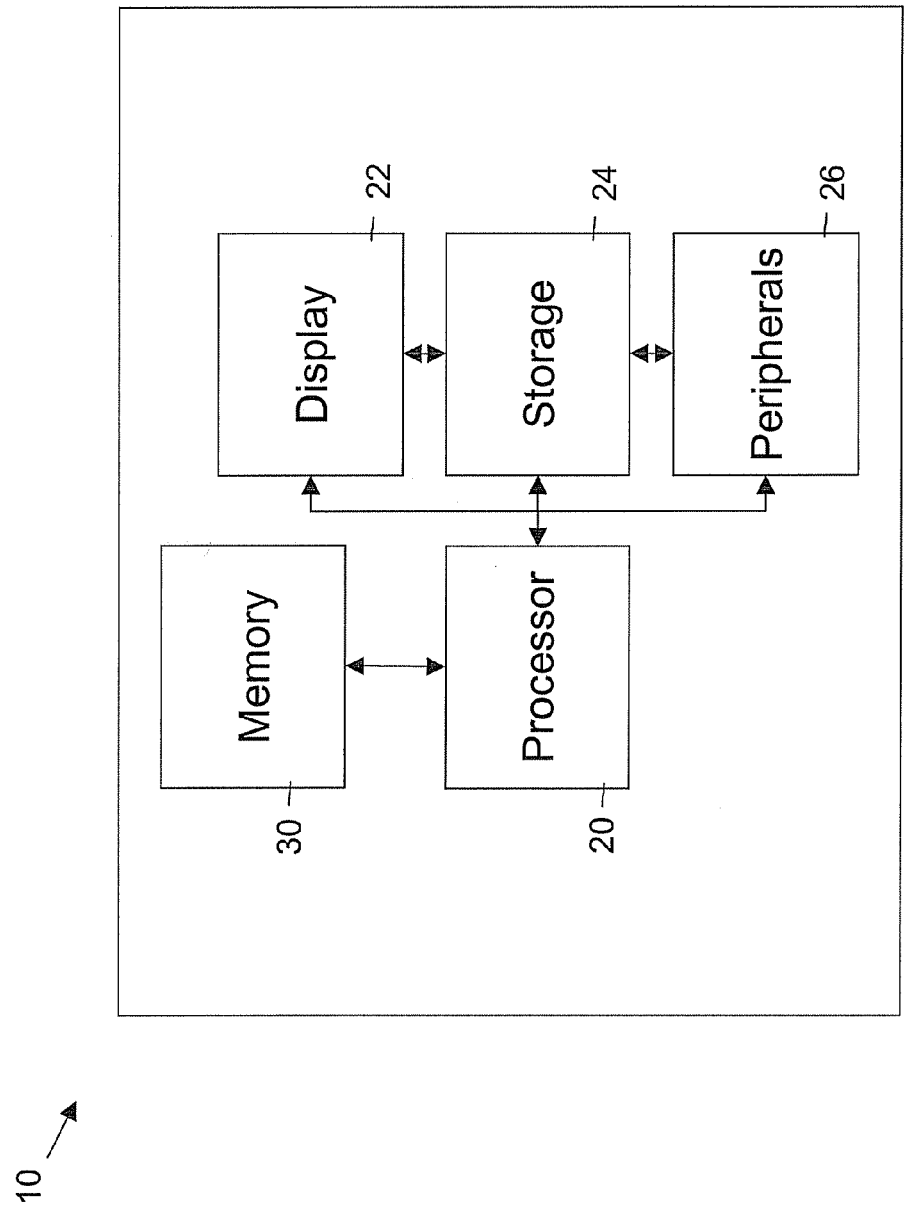
FIG. 1 illustrates a system level diagram of a computer system in accordance with exemplary embodiments.

FIG. 1 illustrates a system level diagram of a computer system 10 in accordance with exemplary embodiments. System 10 includes a general-purpose processor 20 which can include the ability to carry out the scalar, vector, matrix etc. operations described herein. Processor is further coupled to a display 22, a storage device 24, such as a hard drive, and various peripherals 26 for aiding in the implementation of the methods described herein. System 10 further includes a memory 30 for storing instructions, data, calculations, etc. described herein. As discussed above, system 10 can include a single instruction, multiple data (SIMD) processor as processor 20.

Figure 2:
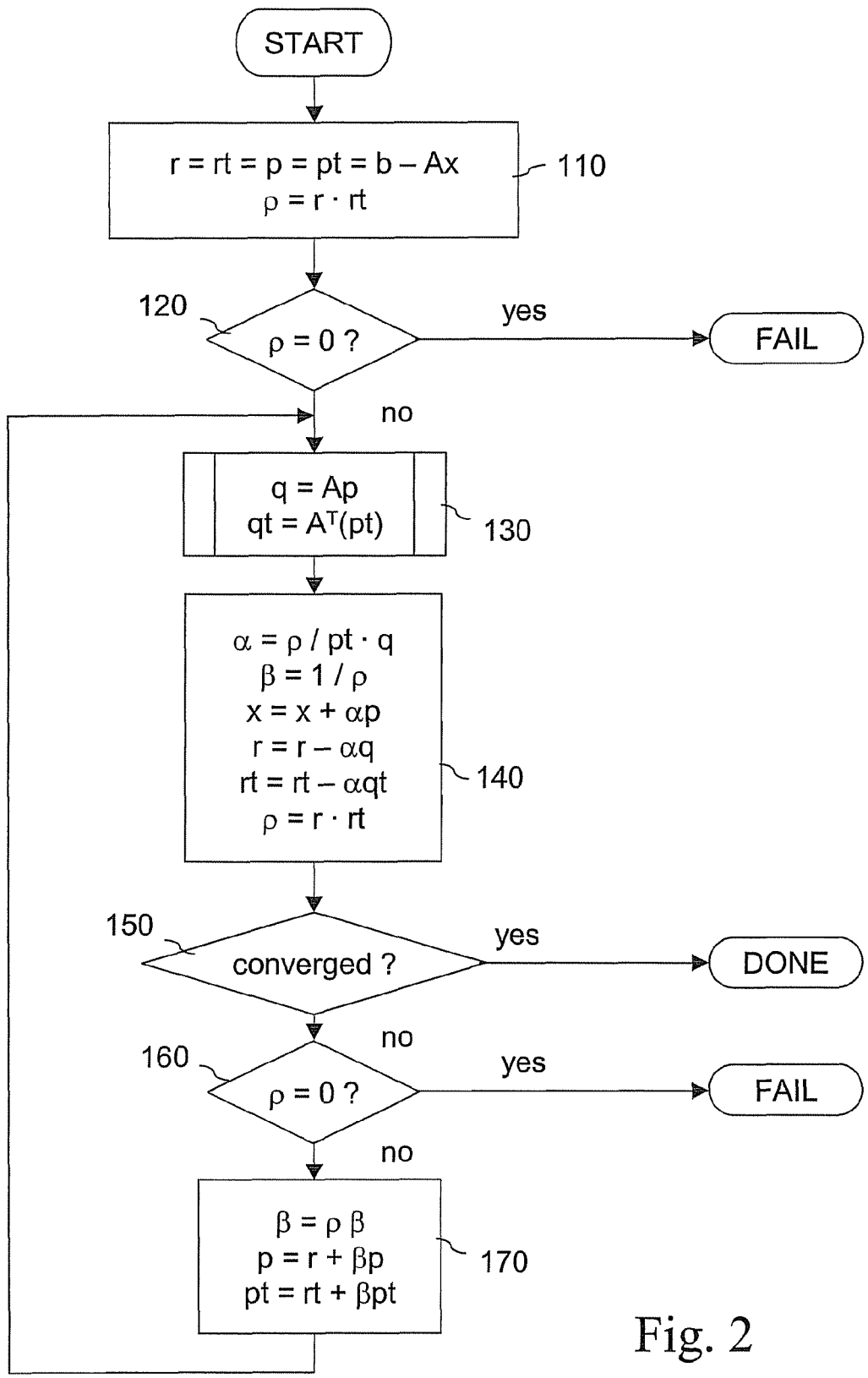
FIG. 2 illustrates a flow chart of pseudocode implementing the solution of A*Δv=b.

FIG. 2 illustrates a flow chart of pseudocode implementing the solution of A*Δv=b. The preconditioner M can be defined to be the identity matrix, so that the "solve" operations reduce to vector copies and the "z" vectors can be replaced by references to the "r" vectors. The loop is rearranged to remove the test for the first iteration. The vectors p̃, q̃, and r̃ are referred to as pt, qt, and rt, respectively; the t's can be thought of as standing for either "tilde" (from the description of the algorithm above) or "transpose" (because they participate in the transpose multiply). Given a sparse matrix A, a vector b, and an initial approximation to the solution x (which in our application is a vector consisting entirely of zeroes), several expressions can be computed. First, b-Ax is computed and the result assigned to each of the vectors r, rt, p, and pt at step 110. The dot product of r with rt is also computed at step 110. If this result is zero at step 120, the method fails. The two matrix-vector products q and qt are computed at step 130. As discussed further below, it is appreciated that the computation of the vectors q and qt are calculated by a single matrix vector multiplication routine that is called once per iteration to determine the value of updated vectors. The scalars alpha and beta are then computed, alpha is used to update the x, r, and rt vectors, and the dot product of r and rt is computed at step 140. Check for convergence at step 150 (in which case the computations are complete) and for a zero dot product at step 160 (in which case the method fails). If there is no 0 dot product at step 160, beta is calculated and used to update the p and pt vectors at step 170, and the loop repeats. With these modifications, there remain two lines in the biconjugate gradient loop that are particularly computation-intensive: the lines involving multiplication of A and $A^T$ by vectors.

A feature of the SPE of the Cell BE is its SIMD architecture; it has a large number of 128-bit ("quadword") registers. Each register is capable of holding four floating-point values, and instructions that operate on these registers can operate on all elements of a register (or registers) simultaneously. Thus, if two registers containing (a,b,c,d) and (e,f,g,h) are added, a result of (a+e, b+f, c+g, d+h) is obtained. A single instruction can also load or store four floating-point values residing in properly aligned contiguous storage locations.

Figure 3:
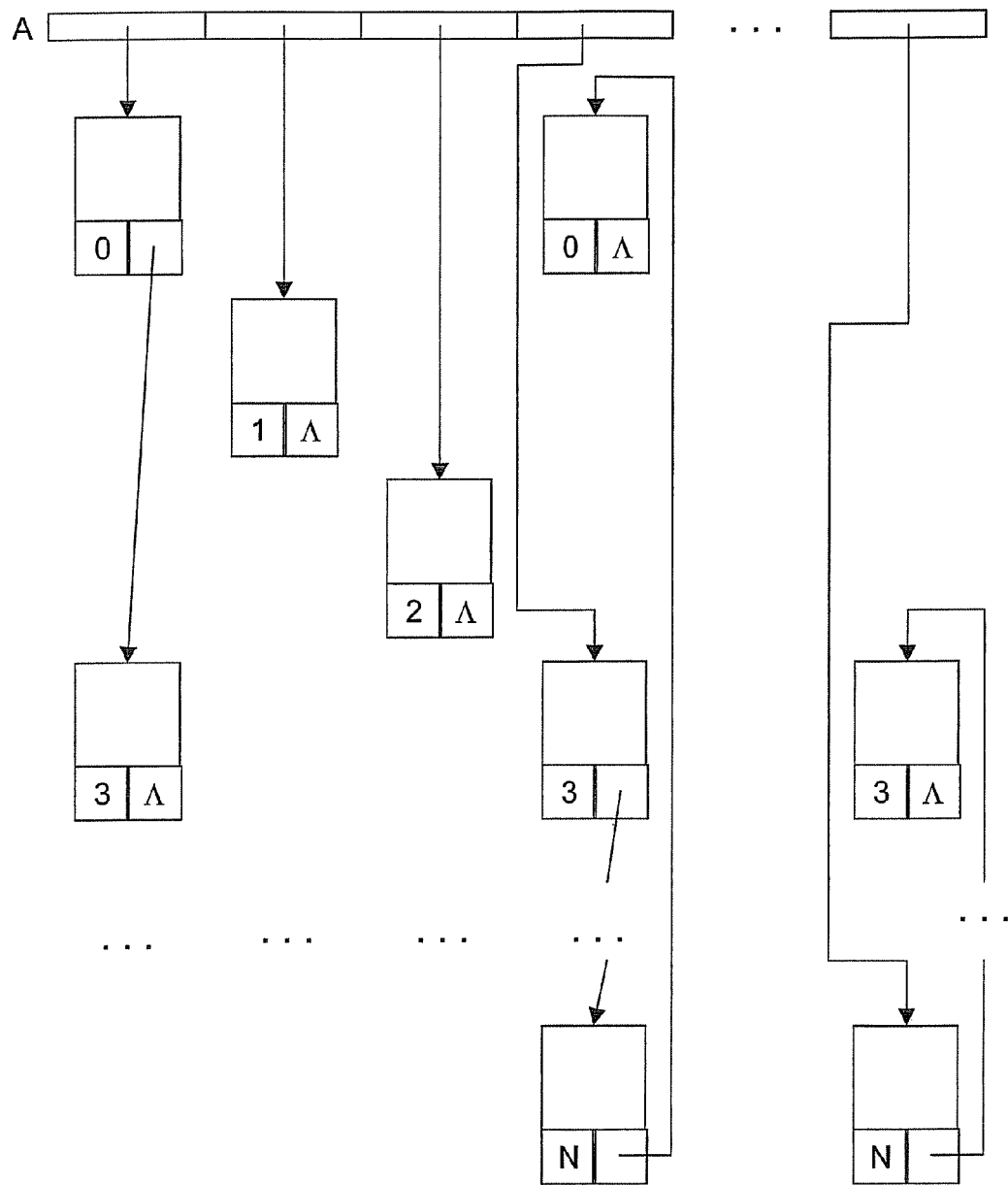
FIG. 3 shows an example of how the square matrix A may be represented in computer storage.

FIG. 3 shows an example of how the square matrix A may be represented in computer storage. Each 6×6 block contains 36 single-precision floats of element data, a row index, and a pointer to the next block in the column. In an exemplary implementation, the 36 elements are stored three to a quadword, with the fourth word containing 0, and the vectors are similarly stored three elements to a quadword. Although it is contemplated to pack them as four to a quadword, calculations outside the biconjugate gradient routine become more complicated. In an exemplary embodiment, the diagonal elements are stored as a one-dimensional array so that the array index of an element indicates its row and column, and the other elements in the column are chained from the diagonal element. It is appreciated that the order in which the elements are chained can vary; a different ordering may produce a slightly different result because of operations being done in a different order. The Λ values indicate null pointers and mark the ends of the chains. If there are additional blocks in the portions of FIG. 3 marked "...", the null chain pointers above them are replaced by pointers to the first such additional block in each column.

Figure 4:
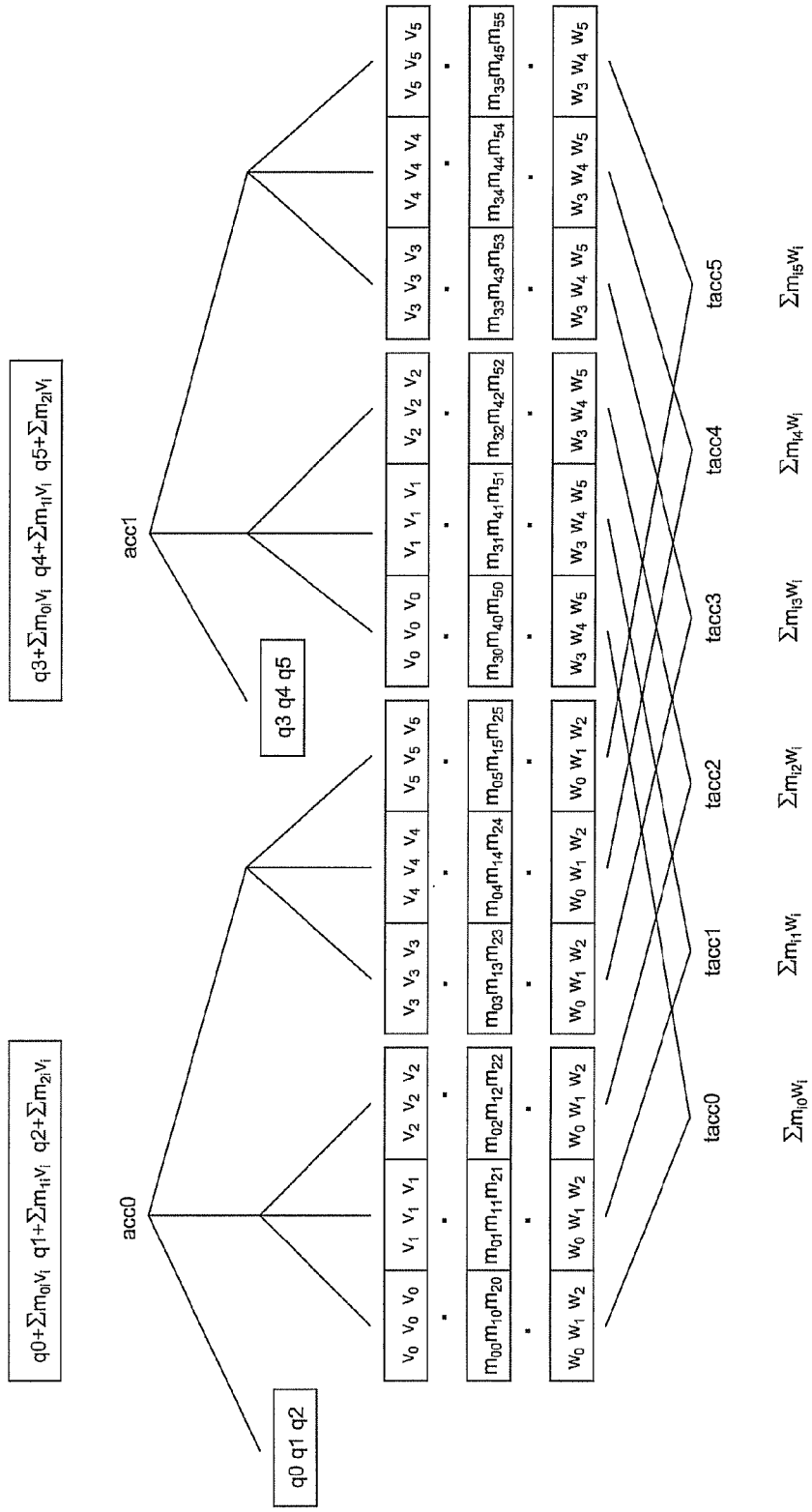
FIG. 4 shows the calculations implemented to update the q and qt vectors for each 6×6 subblock in the matrix A.
Figure 5:
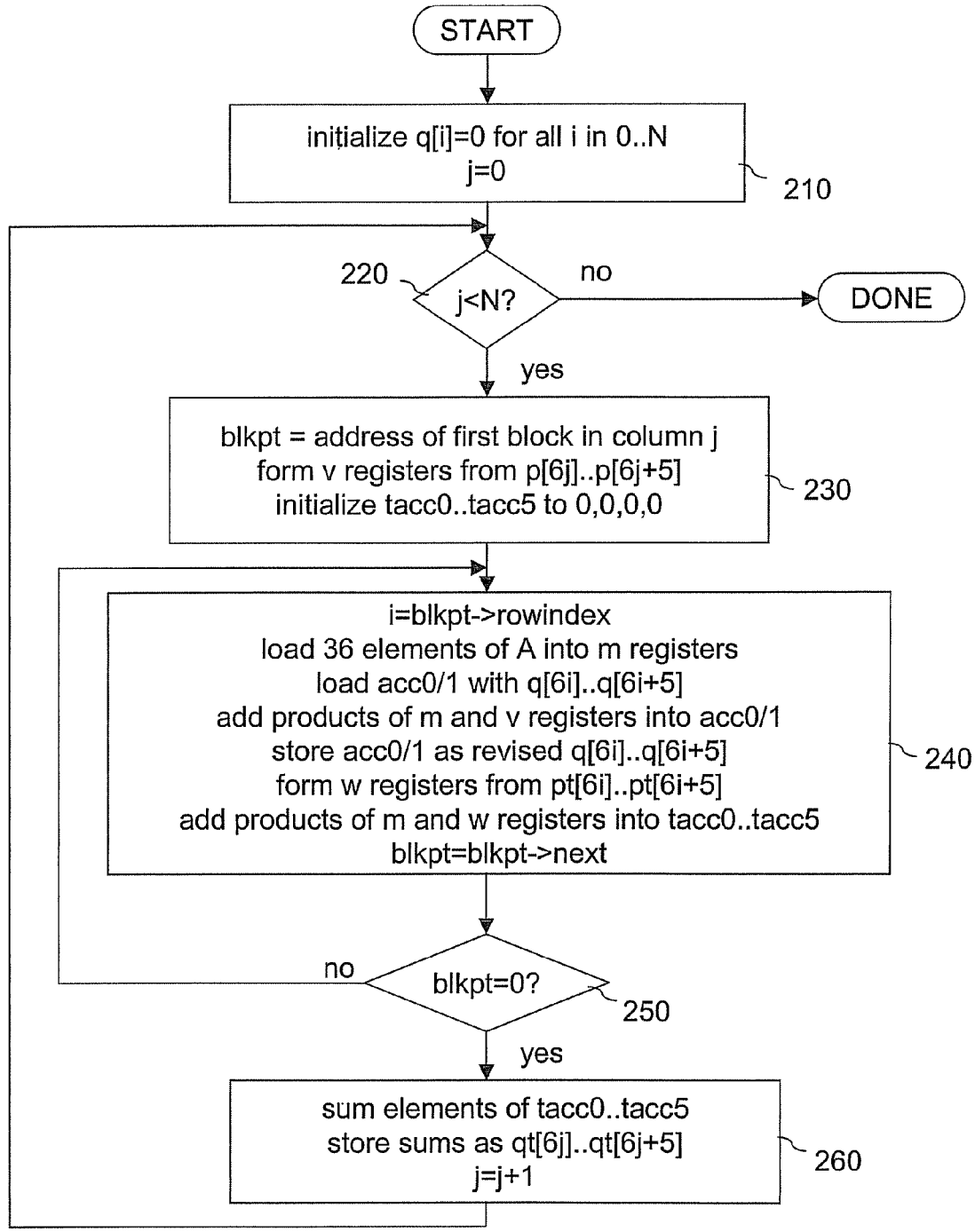
FIG. 5 illustrates an exemplary method of the computation of FIG. 4.

The computation of q=Ap and qt=$A^T$pt is now discussed. In general, p and pt are inputs and q and qt are outputs. FIG. 4 shows the calculations implemented to update the q and qt vectors for each 6×6 subblock in the matrix A, and FIG. 5 illustrates an exemplary method of the computation. The matrix elements $m_{ij}$ are shown in the center of FIG. 4, where i is the row index and j is the column index within the subblock. The subblocks of A are stored as four 3×3 blocks; the 3×3 blocks are stored in row-major order but within each block the elements are stored in column-major order, for ease of computation. Each rectangle in the figure represents a quadword (four single-precision floats), but the fourth word is not used and is not illustrated in FIG. 4. The groups of rectangles show the 3×3 blocks. The 6×6 subblocks are processed reading down the block columns of A.

Referring to FIG. 5, the q vector is initialized to all zeroes at step 210. The column number j is set to 0. At step 220, test to see if the last block column has been processed; if so, processing is complete. Otherwise, the first 6×6 subblock in the chain for the current column is addressed at step 230, which in an exemplary embodiment is the diagonal element. Six elements of the p vector are read, indexed by 6j, 6j+1, 6j+2, ..., 6j+5 and denoted $v_0, v_1, \ldots, v_5$, and shuffled into six "v registers", each of which has three copies of one of the elements. These elements are used to update six elements of the q vector for each subblock in the column. Six 4-float accumulators tacc0, tacc1, ..., tacc5 are initialized so that each contains four zero entries; these accumulators store partial results used to calculate six elements of the qt vector corresponding to the current column, since by reading down the block columns of A, the block rows of $A^T$ are read across. The loop which processes one 6×6 subblock is then entered at step 240.

The row index i is read from the current subblock, and the matrix elements $m_{ij}$ are loaded into quadword registers as shown in FIG. 4. Each 6×6 subblock causes six elements of q to be updated based on the matrix elements and six elements of p. The six elements of q are loaded into two accumulators acc0 and acc1. The v registers are then multiplied with the associated matrix elements as indicated by the dots in FIG. 4, and the products are summed as shown by the lines. It is appreciated that in a SIMD architecture such as that of the Cell BE, vectors are multiplied or summed element by element. Thus, acc0 accumulates the first three elements of the revised q vector, which are q0+$\Sigma m_{0i}v_i$, q1+$\Sigma m_{1i}v_i$, and q2+$\Sigma m_{2i}v_i$, and acc1 accumulates the second three elements, which are q3+$\Sigma m_{3i}v_i$, q4+$\Sigma m_{4i}v_i$, and q5+$\Sigma m_{5i}v_i$. These results are stored back into the q vector as the updated values.

To compute the current subblock's contribution to the six qt values corresponding to the current block column, the appropriate six entries of pt (denoted $w_0, w_1, \ldots, w_5$) are read into two quadword registers, and then multiplied with the appropriate subblock elements as shown by the dots in FIG. 4. It is appreciated that although 12 "w" registers are shown in FIG. 4, there are two distinct sets of values, representing two "w" registers which are each used six times. Two of the resulting products are accumulated into each of the taccN registers. Each taccN register thus has the entries ($m_{0N}w_0$+$m_{3N}w_3$, $m_{1N}w_1$+$m_{4N}w_4$, $m_{2N}w_2$+$m_{5N}w_5$) added to it element-wise. These values sum to the required $\Sigma m_{iN}w_N$. In an exemplary implementation, these sums are completed when all of the subblocks in the block column of A have been processed. The sums of the elements of the taccN registers can then be calculated and stored as the next six elements of qt. In an exemplary implementation, summing the elements of a quadword register is performed outside of the inner loop, at step 260.

After a subblock is processed, the block pointer to address the next subblock in the chain is updated. If there is another block in the chain, the loop to process it is repeated. When the end of the chain is reached, the elements of each of the taccN accumulators are summed and the results qt[6j], qt[6j+1], ..., qt[6j+5] are stored at step 260. If a next block column exists, it is then processed.

It is therefore appreciated that the handling of the A matrix can be minimized by utilizing the features that each 6×6 block affects only six elements of each result vector, and by observing that it is possible to avoid forming the transposes of the individual blocks. By reading down the block columns of A, the shuffling of the elements of p and the summing of the partial results of the transpose multiply are moved out of the inner loop. In a register-rich architecture such as the Cell BE SPE, all of the 36 block elements can be loaded into registers (three to a register) with remaining registers for accumulators and other operands. The transpose of the block is implicit in the way the multiplications are performed and accumulated. In general, the block elements do not have to be rearranged to create a transposed block. The aforementioned loops described above can allow inputs to be loaded farther ahead of the places where they are needed (to cover load latencies), and supplemental accumulators can be implemented to allow more operations to proceed in parallel.

This algorithm is useful because on the Cell BE SPE space is at a premium and a relatively high ratio of computation to storage access and branch instructions is desirable. Other solvers can be substituted for the biconjugate gradient. For example, the conjugate gradient squared algorithm replaces multiplies by A and $A^T$ with two multiplies by A, but the data dependencies are such that they cannot be combined. The overhead of going through A twice remains, and since there is less computation per loop it is harder to utilize the power of the SPE effectively.

Therefore, it is appreciated that a method for a combined matrix-vector and matrix-transpose vector multiply for a block sparse matrix on a single instruction, multiple data (SIMD) processor is described herein. In an exemplary implementation, the following instructions can be implemented for the above-described methods.

Store the block-sparse matrix A as a collection of nonzero subblocks. The blocks are chained in a first dimension (e.g., vertical), with one chain for each position in a second dimension (e.g., horizontal). Each block includes an index giving its position in the matrix in the first dimension. The elements of the subblock are stored in groups corresponding to the processor register size; within each group, elements are ordered reading along the first dimension.

Store the vectors p and pt with elements grouped corresponding to the subblock and processor register sizes (e.g., three to a quadword).

Store the vector q with elements grouped corresponding to the subblock and processor register sizes, with all elements initialized to 0. In an exemplary implementation, no initialization is performed for the vector qt.

For each subblock chain along the second dimension (i.e. each block column),
    For each position along the first dimension of the subblock, initialize a register taccN to all zeroes as an accumulator.
    For each position along the second dimension of the subblock, fill a register vN with copies of the element of the p vector corresponding to that position.
    For each subblock in the chain,
        Read all groups of elements of the subblock into registers.
        Read the elements of q corresponding to the subblock elements along the second dimension into one or more registers. In another exemplary implementation, the sum of the products of the appropriate registers of matrix elements and the SIMD registers vN containing copies of the elements of p corresponding to the horizontal positions in the subblocks are added to the register(s). The resulting register values are used to update the elements of q corresponding to the subblock elements along the second dimension.
        Form the products of the appropriate registers of matrix elements with the elements of pt corresponding to the positions along the first axis and they are added to the taccN accumulators.
    For each taccN accumulator, the individual elements of the accumulator are summed and the result is stored as the element of qt corresponding to current block column, offset by the accumulator's position within the block.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:
1. A method for a combined matrix-vector and matrix transpose-vector calculation for a block-sparse matrix A that computes q=Ap and qt=$A^T$(pt) to iteratively solve a system of equations A*Δv=b for updating a simulation of physical objects in an interactive computer environment, wherein the vector Δv represents a change in velocity of the physical objects and the vector b represents an expected position of the physical objects, and wherein the vectors p, pt, q, and qt are variables for performing a biconjugate gradient algorithm, the interactive computer environment having a processor, a memory and a display, the method comprising:

generating a set of representations of objects in the interactive computer environment;

partitioning the set of representations into a plurality of subsets such that objects in any given set interact only with other objects in that set;

storing the matrix A as a collection of nonzero subblocks chained in a first dimension, with one chain for each position in a second dimension, such that each subblock comprises an index giving its position in the first dimension and the subblock elements are stored in groups corresponding to a register size and ordered reading along the first dimension within the group;

applying a biconjugate gradient algorithm to solve A*Δv=b for the vector Δv of velocity changes applied to each object, wherein a single matrix-vector multiplication routine is called once per iteration to read the matrix A a single time and produce two matrix-vector products from the single time, one matrix-vector product involving A and the other involving the transpose of A, to determine the value of two vectors used to update the residuals used in the biconjugate gradient algorithm, without explicitly forming the transpose of A, wherein applying the biconjugate gradient algorithm comprises computing q=Ap and qt=$A^T$(pt) by:

for each subblock chain along the second dimension, performing:

for each position along the first dimension of the subblock, initializing a register as an accumulator;

for each position along the second dimension of the subblock, filling a register with copies of the element of the p vector corresponding to that position;

for each subblock in the chain, performing:

updating the elements of q corresponding to the subblock elements along the second dimension, based on appropriate matrix elements and copies of the p vector elements corresponding to the horizontal positions in the subblocks; and updating the accumulators based on the products of the matrix elements with the elements of pt corresponding to the positions along the first dimension; and for each accumulator, updating the element of qt corresponding to the chain offset by the accumulator's position within the subblock, based on a sum of individual elements of the accumulator; and applying, by a computer processor, the vector Δv of velocity changes to determine a next state of the simulated objects.

2. The method of claim 1, further comprising, for each of the plurality of subsets, generating the block-sparse matrix A representing the interactions between said objects in said plurality of subsets, wherein nonzero sub-matrices representing the direct interaction of said objects are stored along with coordinate information corresponding to a position of each one of said sub-matrices within the block-sparse matrix A, said sub-matrices being derived from the positions and motions of said objects.

3. The method of claim 1, wherein applying the biconjugate gradient algorithm further comprises:

calculating b−Ax;

assigning results of the b−Ax calculation to vectors r, rt, p, and pt;

defining a vector procedure computing the dot product of r and rt;

using said vector procedure to determine if the dot product result is 0, in which case, recording a calculation failure;

defining an iterative loop, wherein the iterative loop comprises the computing of q=Ap and qt=$A^T$(pt), and wherein the iterative loop further comprises:

calculating scalar quantities α and β;

updating said x, r and rt vectors as defined by x=x+αp, r=r−αq, and rt=rt−αqt;

computing the dot product of r and rt;

defining a test procedure for determining convergence of the dot product of r and rt;

using said test procedure to determine if convergence has occurred, in which case, recording a complete calculation;

using said vector procedure to determine if the dot product result is 0, in which case, recording a calculation failure; and updating said scalar β and said vectors p and pt; and repeating the iterative loop until at least one of convergence of r and rt being achieved and the dot product result is 0.

4. The method of claim 3, wherein the matrix A is defined by M rows and N columns.

5. A system for a combined matrix-vector and matrix transpose-vector calculation for a block-sparse matrix A that computes q=Ap and qt=$A^T$(pt) to iteratively solve a system of equations A*Δv=b for updating a simulation of physical objects in an interactive computer environment, wherein the vector Δv represents a change in velocity of the physical objects and the vector b represents an expected position of the physical objects, and wherein the vectors p, pt, a, and at are variables for performing a biconjugate gradient algorithm, the interactive computer environment having a processor, a memory and a display, the method comprising:

one or more computer processors configured to:

generate a set of representations of objects in the interactive computer environment;

partition the set of representations into a plurality of subsets such that objects in any given set interact only with other objects in that set;

store the matrix A as a collection of nonzero subblocks chained in a first dimension, with one chain for each position in a second dimension, such that each subblock comprises an index giving its position in the first dimension and the subblock elements are stored in groups corresponding to a register size and ordered along the first dimension within the group;

apply a biconjugate gradient algorithm to solve A*Δv=b for the vector Δv of velocity changes applied to each object, wherein a single matrix-vector multiplication routine is called once per iteration to read the matrix A a single time and produce two matrix-vector products from the single time, one matrix-vector product involving A and the other involving the transpose of A, to determine the value of two vectors used to update the residuals used in the biconjugate gradient algorithm, without explicitly forming the transpose of A, wherein, to apply the biconjugate gradient algorithm, the one or more computer processors are further configured to compute q=Ap and qt=$A^T$(pt) by:

for each subblock chain along the second dimension, performing:
    for each position along the first dimension of the subblock, initializing a register as an accumulator;
    for each position along the second dimension of the subblock, filling a register with copies of the element of the p vector corresponding to that position;
    for each subblock in the chain, performing:
        updating the elements of q corresponding to the subblock elements along the second dimension, based on appropriate matrix elements and copies of the p vector elements corresponding to the horizontal positions in the subblocks; and
        updating the accumulators based on the products of the matrix elements with the elements of pt corresponding to the positions along the first dimension; and
    for each accumulator, updating the element of qt corresponding to the chain offset by the accumulator's position within the subblock, based on a sum of individual elements of the accumulator; and
apply the vector $\Delta v$ of velocity changes to determine a next state of the simulated objects.

6. The system of claim 5, wherein for each of the plurality of subsets, the one or more computer processors are further configured to generate the block-sparse matrix A representing the interactions between the objects in the plurality of subsets, wherein nonzero sub-matrices representing the direct interaction of the objects are stored along with coordinate information corresponding to a position of each one of the sub-matrices within the block-sparse matrix A, the sub-matrices being derived from the positions and motions of the objects.

7. The system of claim 5, wherein, to apply the biconjugate gradient algorithm, the one or more computer processors are further configured to:
calculate b−Ax;
assign results of the b−Ax calculation to vectors r, rt, p, and pt;
define a vector procedure computing the dot product of r and rt;
use the vector procedure to determine if the dot product result is 0, in which case, recording a calculation failure;
define an iterative loop, wherein the iterative loop comprises the computing of q=Ap and qt=$A^T$(pt), and wherein the iterative loop further comprises:
    calculating scalar quantities $\alpha$ and $\beta$;
    updating the x, r and rt vectors as defined by x=x+$\alpha$p, r=r−$\alpha$q, and rt=rt−$\alpha$qt;
    computing the dot product of r and rt;
    defining a test procedure for determining convergence of the dot product of r and rt;
    using the test procedure to determine if convergence has occurred, in which case, recording a complete calculation;
    using the vector procedure to determine if the dot product result is 0, in which case, recording a calculation failure; and
    updating the scalar $\beta$ and the vectors p and pt; and
repeat the iterative loop until at least one of convergence of r and rt being achieved and the dot product result is 0.

8. The system of claim 7, wherein the matrix A is defined by M rows and N columns.

9. A computer program product for a combined matrix-vector and matrix transpose-vector calculation for a block-sparse matrix A that computes q=Ap and qt=$A^T$(pt) to iteratively solve a system of equations A*$\Delta v$=b for updating a simulation of physical objects in an interactive computer environment, wherein the vector $\Delta v$ represents a change in velocity of the physical objects and the vector b represents an expected position of the physical objects, and wherein the vectors p, pt, q, and qt are variables for performing a biconjugate gradient algorithm, the computer program product comprising a non-transitory computer readable storage medium having program instructions embodied therewith, the program instructions executable by a processor to cause the processor to perform a method comprising:
storing the matrix A as a collection of nonzero subblocks chained in a first dimension, with one chain for each position in a second dimension, such that each subblock comprises an index giving its position in the first dimension and the subblock elements are stored in groups corresponding to a register size and ordered reading along the first dimension within the group;
applying a biconjugate gradient algorithm to solve A*$\Delta v$=b for the vector $\Delta v$ of velocity changes applied to each object, wherein a single matrix-vector multiplication routine is called once per iteration to read the matrix A a single time and produce two matrix-vector products from the single time, one matrix-vector product involving A and the other involving the transpose of A, to determine the value of two vectors used to update the residuals used in the biconjugate gradient algorithm, without explicitly forming the transpose of A, wherein applying the biconjugate gradient algorithm comprises computing q=Ap and qt=$A^T$(pt) by:
for each subblock chain along the second dimension, performing:
    for each position along the first dimension of the subblock, initializing a register as an accumulator;
    for each position along the second dimension of the subblock, filling a register with copies of the element of the p vector corresponding to that position;
    for each subblock in the chain, performing:
        updating the elements of q corresponding to the subblock elements along the second dimension, based on appropriate matrix elements and copies of the p vector elements corresponding to the horizontal positions in the subblocks; and
        updating the accumulators based on the products of the matrix elements with the elements of pt corresponding to the positions along the first dimension; and
    for each accumulator, updating the element of qt corresponding to the chain offset by the accumulator's position within the subblock, based on a sum of individual elements of the accumulator; and
applying the vector $\Delta v$ of velocity changes to determine a next state of the simulated objects.

10. The computer program product of claim 9, the method further comprising, for each of the plurality of subsets, generating the block-sparse matrix A representing the interactions between said objects in said plurality of subsets, wherein nonzero sub-matrices representing the direct interaction of said objects are stored along with coordinate information corresponding to a position of each one of said sub-matrices within the block-sparse matrix A, said sub-matrices being derived from the positions and motions of said objects.

11. The computer program product of claim 9, wherein applying the biconjugate gradient algorithm further comprises:
calculating b−Ax;
assigning results of the b−Ax calculation to vectors r, rt, p, and pt;

defining a vector procedure computing the dot product of r and rt;

using said vector procedure to determine if the dot product result is 0, in which case, recording a calculation failure;

defining an iterative loop, wherein the iterative loop comprises the computing of q=Ap and qt=$A^T$(pt), and wherein the iterative loop further comprises:

calculating scalar quantities $\alpha$ and $\beta$;

updating said x, r and rt vectors as defined by x=x+$\alpha$p, r=r−$\alpha$q, and rt=rt−$\alpha$qt;

computing the dot product of r and rt;

defining a test procedure for determining convergence of the dot product of r and rt;

using said test procedure to determine if convergence has occurred, in which case, recording a complete calculation;

using said vector procedure to determine if the dot product result is 0, in which case, recording a calculation failure; and updating said scalar $\beta$ and said vectors p and pt; and repeating the iterative loop until at least one of convergence of r and rt being achieved and the dot product result is 0.

12. The computer program product of claim 11, wherein the matrix A is defined by M rows and N columns.

\* \* \* \* \*